Figure 1:
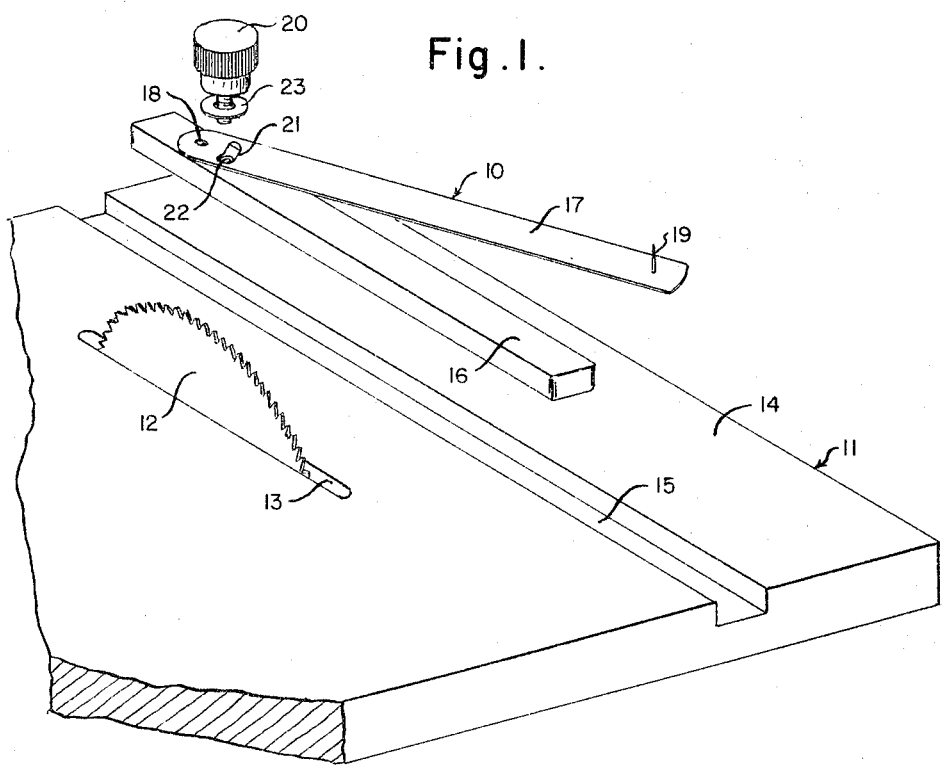

Aug. 30, 1966 W. R. HOUSTON, JR 3,269,435

DISC-CUTTING GUIDE FOR TABLE SAWS

Filed July 2, 1964

INVENTOR
William R. Houston, Jr.
*Hooper Leonard & Bull*
*his Attorneys*

3,269,435
DISC-CUTTING GUIDE FOR TABLE SAWS
William R. Houston, Jr., 107 Rodgers St., Monongahela, Pa.
Filed July 2, 1964, Ser. No. 379,902
5 Claims. (Cl. 143—171)

This invention relates generally to table saw attachments and more particularly to a guide device for use with a table saw to cut discs and the like.

The cutting of a circle or disc from a workpiece with a table saw has always been a difficult, exasperating and dangerous operation without a guide or attachment to assist the operator in doing so. Various aides have heretofore been devised to assist an operator in this area. They have had shortcomings, however, primarily in the fact that they either engage the workpiece such that it is elevated from the work table to the extent that it is subject to wobbling during cutting with consequent poor results or they are too cumbersome for practical use. Others are quite complicated and expensive devices.

I have devised an attachment for this purpose that is not only practical from the standpoint that it operates effectively and simply without any wobble but also from the standpoint that it is so simplified in structure as to reduce manufacturing cost to a mere fraction of that of prior devices.

I provide a disc-cutting guide for use with a table saw having a table, a saw blade extending through said table and at least one miter gauge slot in the table top arranged in parallel spaced relation with said saw blade, said guide comprising a support means slidable in said miter guage slot, a guide arm member swingably mounted on said support means and disposed thereon such that the lower face of said arm member rests flat on said table top and swings in a plane adjacent and parallel to said table top, said guide arm member having an upstanding workpiece engaging pin therein, said arm member being of relatively thin flat stock such that a workpiece engaged by said pin and resting on said arm member is only very slightly raised from said table top and releasable locking means operable to hold said swingable arm at a selected position relative to said support means.

Preferably said support means is of a height that when disposed in said miter guage slots its top surface is flush with said table top and flat against the bottom surface of said guide arm member.

I also prefer that said guide arm member has said upstanding pin disposed near one end thereof and is swingably attached to said support means near the other end thereof. In addition, I prefer that said guide arm member be made of thin, flat metallic stock of a thickness of from about .015 inch to about .035 inch.

In one embodiment of my invention, the upstanding workpiece engaging pin mounted on said guide arm member is disposed near the edge of said guide arm member adjacent said saw blade.

From the foregoing it should be clear that I have devised a disc-cutting guide that eliminates wobble in operation because the arm is flat and of a thickness such that the workpiece is just barely raised off the table and is so simple in structure, having only a very few parts, that it is very inexpensive to manufacture compared to previous devices for this purpose.

Other details, objects and advantages of the invention will become apparent as the following description of a present preferred embodiment thereof proceeds.

Figure 2:
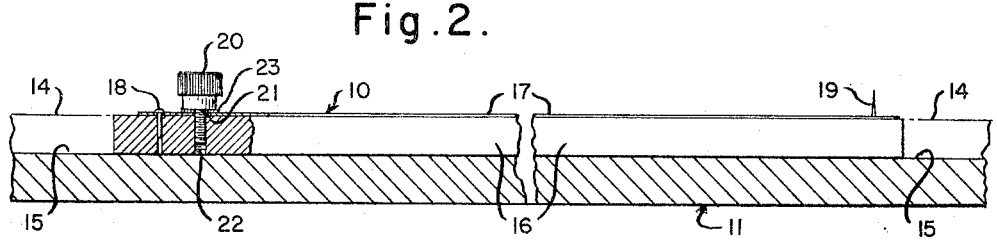
Figure 3:
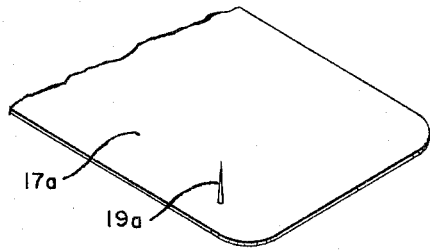

In the accompanying drawing, I have shown a present preferred embodiment of the invention in which FIGURE 1 is an exploded isometric view of my disc-cutting guide shown with a partial view of a saw table also in isometric;

FIGURE 2 is a fragmentary longitudinal cross-sectional view of my disc-cutting guide in operative position; and FIGURE 3 is a fragmentary isometric view of a modified guide arm member.

Referring to the drawing, I have there illustrated my disc-cutting guide 10 shown with a table saw 11. Table saw 11 has a saw 12 extending through an opening 13 in the table top 14 with at least one miter guage slot 15 disposed in table top 14 and arranged in parallel spaced relation to saw 12.

As there shown, disc-guide 10 comprises a supporting bar 16 which is slidable in slot 15 and is of a height such that when bar 16 is disposed in slot 15, the top surface thereof is flush with the top surface of table top 14. A guide arm member 17 is swingably attached near one end thereof to bar 16 as by a pin 18 and carries near the other end thereof an upright work engaging pin 19. As shown in the drawing, arm member 17 is flat and very thin and I have found that flat metal stock on the order of .015 to .035 inch thickness suffices very well for the purposes of my invention.

From the foregoing it will be understood that with support bar 16 disposed in slot 15 the lower face or surface of guide arm member 17 rests flat against table top 14 and will swing in a plane that is adjacent and parallel to table top 14 so that no matter where arm member 17 is swing to its lower surface will always be resting flat against the surface of table top 14.

I further provide suitable locking means operable to lock and hold arm member 17 in a selected position with respect to support bar 16. In the drawing, I have illustrated such a locking means comprising a thumbscrew 20 which passes through an arcuate opening 21 in guide arm member 17 and screws into a threaded opening 22 disposed in support bar 16. A washer 23 is also provided.

In operating my device, the operator simply places support bar 16 in slot 15. Support bar 16 is moved along slot 15 until pin 19 is alongside saw 12 and the radius of the disc to be cut is then the shortest distance from pin 19 to saw 12. The operator then swings guide arm member 17 to the left or right to set the correct radius of the disc to be cut and having selected the proper radius he then turns down thumbscrew 20 and locks guide arm member 17 in place. The workpiece is then placed on pin 19 near the center of the workpiece and driven down onto pin 19 so that it rests flat on guide arm member 17. The operator cuts the disc by sliding the workpiece along the table into the saw, then back to pivot the workpiece on pin 19 and then advancing through saw 12 again and so forth, advancing to cut and returning to pivot until enough cuts have been taken to result in a disc of the selected radius. In using my device the operator will notice that there is no wobble because guide arm member 17 is sufficiently thin that table top 14 prevents the workpiece from wobbling.

Although my disc-cutting guide is not limited to being made from any particular material, I prefer that it be made of metal, not only because such is more durable but also because it slides easily with respect to the table tops which are usually made of metal also and thus makes my guide easier to utilize.

It will also be readily recognized that the wider my guide arm member is, the more stability the workpiece disposed thereon will have during the cutting operation and in FIGURE 3 I show a guide arm member 17a, that is considerably wider that that shown in FIGURE 1. In this latter case, however, it will be noted that the workpiece engaging pin 19a is offset or disposed to the side of guide arm member 17a nearest the saw blade 12. This is to facilitate the cutting of small radius discs without saw 12 striking guide arm member 17a.

It will also be understood that by widening guide arm member 17 at arcuate opening 21, a larger opening can be provided to permit a larger degree of swing between guide arm member 17 and supporting bar 16 to facilitate the cutting of larger discs and similarly that other locking means than that shown can be substituted without departing from the spirit of the invention.

Thus, while I have shown and described a present preferred embodiment of the invention, it should be distinctly understood that the invention is not limited thereto but may be otherwise variously embodied within the scope of the following claims.

I claim:

1. A disc-cutting guide for use with a table saw having a table, a saw blade extending through said table and at least one miter guage slot in the table top arranged in parallel spaced relation with said saw blade, said guide comprising a support means slidable in said miter guage slot, a guide arm member swingably mounted on said support means such that the lower face of said arm member rests flat on said table top and swings in a plane adjacent and parallel to said table top, said guide arm member having an upstanding workpiece engaging pin therein, said arm member being of relatively thin flat stock such that a workpiece engaged by said pin and resting on said arm member is only very slightly raised from said table top and releasable locking means operable to hold said swingable arm at a selected position relative to said support means.

2. A disc-cutting guide as claimed in claim 1 wherein said support means is of a height that when disposed in said miter guage slot its top surface is flush with said table top and flat against the bottom surface of said guide arm member.

3. A disc-cutting guide for use with a table saw having a table, a saw blade extending through said table and at least one miter guage slot in the table top arranged in parallel spaced relation with said saw blade, said guide comprising a support means slidable in said miter guage slot, a guide arm member swingably mounted near one end thereof on said support means such that the lower face of said arm member rests flat on said table top and swings in a plane adjacent and parallel to said table top, said guide arm member carrying near its other end an upstanding workpiece engaging pin, said arm member being of relatively thin flat stock such that a workpiece engaged by said pin and resting on said arm member is only very slightly raised from said table top and releasable locking means operable to hold said swingable arm at a selected position relative to said support means.

4. A disc-cutting guide as claimed in claim 3 wherein said arm member is made of thin flat metallic stock of a thickness of from about .015 inch to about .035 inch.

5. A disc-cutting guide as claimed in claim 3 wherein said upstanding workpiece engaging pin mounted on said guide arm member is disposed near the edge of said guide arm member adjacent said saw blade.

No references cited.

DONALD R. SCHRAN, *Primary Examiner.*